United States Patent
Shah et al.

(10) Patent No.: US 7,389,300 B1
(45) Date of Patent: Jun. 17, 2008

(54) SYSTEM AND METHOD FOR MULTI-STAGED IN-MEMORY CHECKPOINT REPLICATION WITH RELAXED CONSISTENCY

(75) Inventors: Veeral Shah, Mumbai (IN); Ankur Panchbudhe, Pune (IN); Anand A. Kekre, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 398 days.

(21) Appl. No.: 11/139,101

(22) Filed: May 27, 2005

(51) Int. Cl.
*G06F 7/00* (2006.01)
*G06F 17/00* (2006.01)
(52) U.S. Cl. ...................... 707/101; 707/102
(58) Field of Classification Search ..... 707/100–104.1; 711/161; 395/200–200.51
See application file for complete search history.

(56) References Cited

U.S. PATENT DOCUMENTS

| | | | |
|---|---|---|---|
| 4,432,057 A * | 2/1984 | Daniell et al. ................. | 707/8 |
| 5,956,489 A * | 9/1999 | San Andres et al. ......... | 709/221 |
| 6,606,744 B1 * | 8/2003 | Mikurak ...................... | 717/174 |
| 6,748,447 B1 * | 6/2004 | Basani et al. ................ | 709/244 |
| 6,823,474 B2 | 11/2004 | Kampe et al. | |
| 6,883,110 B1 * | 4/2005 | Goddard ........................ | 714/6 |
| 7,032,089 B1 * | 4/2006 | Ranade et al. .............. | 711/161 |
| 2004/0003094 A1 * | 1/2004 | See ............................. | 709/227 |
| 2004/0148420 A1 * | 7/2004 | Hinshaw et al. ............ | 709/231 |
| 2005/0021751 A1 * | 1/2005 | Block et al. ................. | 709/225 |

OTHER PUBLICATIONS

Morin, C. et al, "A two-level checkpoint algorithm in a highly-available parallel single level store system," IEEE, 2001, pp. 514-520.
Zheng, G., et al, "FTC-Charm++: An In-Memory Checkpoint-Based Fault Tolerant Runtime for Charm++ and MPI," Department of Computer Science, University of Illinois at Urbana-Champaign, pp. 1-25.
Monnet, S., et al, "A Hierarchical Checkpointing Protocol for Parallel Applications in Cluster Federations," Institut National De Recherche en Informatique et an Automatique, Jan. 2004, pp. 1-27.

* cited by examiner

*Primary Examiner*—Mohammad Ali
*Assistant Examiner*—Angelica Ruiz
(74) *Attorney, Agent, or Firm*—Meyertons Hood Kivlin Kowert & Goetzel, P.C.; B. Noël Kivlin

(57) ABSTRACT

A system for multi-staged in-memory checkpoint replication with relaxed consistency includes a replication manager and a cluster with a plurality of nodes. In accordance with a configurable replication policy, the replication manager may be configured to identify a primary group of nodes to store primary replicas of a specified source memory region of a source node, and to identify a node of the primary group as an initiator of replication to a secondary group of nodes. In response to a replication request, the replication manager may be configured to copy contents of one or more data blocks of the source memory region to a each node of the primary group within a single atomic transaction, and initiate an operation to copy the contents of the data blocks from the initiator to an additional node of the secondary group.

24 Claims, 10 Drawing Sheets

Computer Readable Medium 1000

Replication and Recovery Software 1010

FIG. 10

SYSTEM AND METHOD FOR MULTI-STAGED IN-MEMORY CHECKPOINT REPLICATION WITH RELAXED CONSISTENCY

BACKGROUND OF THE INVENTION

1. Field of the Invention

This invention relates to computer systems and, more particularly, to replication of application checkpoint data.

2. Description of the Related Art

In the data centers of many enterprises, computer servers may be organized as one or more clusters of multiple cooperating nodes, where each node of a given cluster includes a computer server, and where the nodes of a cluster cooperate with each other to perform the data accesses and computations desired. Such clustered environments may be implemented for a variety of reasons: for example, to increase application availability, to increase the total computing capacity or storage capacity that may be utilized for a given application, and/or to support centralized management of the servers. In particular, clusters may be used to implement various types of application recovery mechanisms, including several types of failover mechanisms.

Typically, cluster-based failover mechanisms may allow an application (or a component of a distributed application) that normally executes on a first node (which may be called a primary node) of the cluster to be started at a different node (which may be called a secondary node) in the event of a failure at the first node. In order to start the application at the secondary node, the state of the application may typically be recovered at the second node using any of a variety of techniques. From an application user's perspective, two different objectives may need to be considered with respect to application state recovery. The first objective may be termed a "recovery point" objective: that is, a point of time in the past up to which a consistent copy of application data must be recovered in the event of a service disruption or failure. The second objective may be termed a "recovery time" objective: that is, the amount of time elapsed before business functionality is restored after a service disruption. Users typically want to minimize recovery time and also have the recovery point be as close to the point of failure detection as possible.

In some traditional recovery mechanisms, the state of the application data may be stored, e.g., periodically and/or on demand, in shared persistent storage such as a disk device that is accessible from both the primary and the secondary node. When a failure at the primary node is detected, the secondary node may read the latest version of the application state from the shared persistent storage, and may start a failover version of the application using the application state information read in. For many classes of applications, however, storing application state to disk may be too expensive, e.g., in terms of the resources needed to save the state and/or the time taken to recover the state from disk. For example, the overhead of disk latency (e.g., seek and rotational latency) associated with updating application state on disk may have a significant negative impact on perceived application execution speed. Thus, such disk-based application state recovery may result in excessive application overhead, unacceptably large recovery times as well as unacceptable recovery points.

As a result, some cluster-based recovery solutions have implemented in-memory checkpoint replication techniques. The term checkpoint may refer to one or more regions of memory that include application state information needed for application failover. For further enhancements to availability, checkpoints may be replicated to multiple nodes, from which a particular node may be chosen for failover in the event of a failure at the primary node. In order to ensure consistency of the replicated versions of the checkpoints at different nodes, checkpoint replication may be performed atomically in some environments. Typical atomic replication protocols that rely on two-phase commit or other techniques that require multiple messages to be exchanged between primary and secondary nodes for each committed set of changes may not scale as the number of replicating nodes is increased. In such replication protocols, for example, the messaging traffic for the replication protocol and/or the processing required for the replication protocol may become a bottleneck that adversely affects both recovery time and recovery point objectives.

SUMMARY

Various embodiments of a system and method for multi-staged in-memory checkpoint replication with relaxed consistency are disclosed. According to a first embodiment, the system includes a cluster with a plurality of nodes including a source node and a replication manager. The replication manager may comprise a plurality of components, including, for example, a local replication manager component at one or more nodes of the cluster. In accordance with a configurable replication policy, the replication manager may be configured to identify a primary group of one or more cluster nodes to store primary replicas of a specified source memory region of the source node, and to identify a node of the primary group as an initiator of replication to a secondary group of one or more cluster nodes. The configurable replication policy may be used to specify a number of criteria for the identification of the nodes, such as performance criteria or software compatibility criteria, and may also allow a specification of a desired number of replication stages, a desired number of nodes and/or initiators at each stage, etc. In response to a replication request, in one embodiment the replication manager may be configured to copy contents of one or more data blocks of the source memory region to a respective primary replica at each node of the primary group within a single atomic transaction, and initiate an operation to copy the contents of the data blocks from the initiator to an additional node of the secondary group. The source memory region may, for example, be used to store state information for an application running at the source node, and one of the replicas of the state information may be used in some embodiments to establish application state at a different node to support a failover of the application.

According to one embodiment, the replication manager may be configured to receive the replication request from an application at the source node, and to send an acknowledgment of transaction completion to the application when replication to the nodes of the primary group is completed. Prior to sending the acknowledgment, the replication manager (e.g., a local component of the replication manager at the initiator) may be configured to generate a commit record for the transaction, and make the commit record accessible to the nodes of the secondary group. The consistency semantics for the primary group, i.e., for the primary stage of replication, may require that all primary replicas be consistent with one another. In some embodiments, replication to the secondary group may be asynchronous with respect to the replication to the primary group: thus, for example, at a given point in time the contents of various secondary replicas may differ relative to each other and relative to the primary replicas. The commit record may include, for example, a unique transaction identifier and an identification of the specific data blocks that are being replicated as part of the transaction. In some implementations, the commit record may also be made accessible to the nodes of the primary group and/or to the source node. In one embodiment, the replication manager may be configured to write the commit record to a shared storage device, which may be accessible from multiple nodes of the cluster. In addition, the replication manager may be configured to generate a secondary replication completion record associated with (or included within) the commit record. When a particular secondary group node completes replicating the blocks corresponding to the transaction identified in the commit record, the replication manager (e.g., a local component of the replication manager at the particular secondary group) may be configured to update the secondary replication record accordingly—that is, the secondary replication completion record may serve to identify those secondary group nodes where replication for the associated transaction has been completed. Writes to either or both of the commit record and the secondary replication completion record may be performed synchronously and atomically in some embodiments. In other embodiments, for example where a shared storage device accessible from multiple secondary group nodes may not be available, the replication manager (e.g., a local component of the replication manager at the initiator) may be configured to send messages containing contents of the commit record to multiple secondary group nodes, and send the acknowledgment of transaction completion to the application after each ensuring that the secondary group nodes have all received the entire commit record contents. In some such embodiments, the replication of the commit record contents at the secondary group nodes may be atomic (e.g., using a two-phase commit protocol) and/or synchronous.

According to another embodiment, the secondary group may include a plurality of nodes, and the system may include a recovery manager configured to support application failover. Upon a detection of a failure (e.g., a failure of an application at the source node whose state is being replicated, or a failure of the source node itself), the recovery manager may be configured to make a determination whether one or more nodes of the primary group are operational. If such primary group nodes are found, one primary group node may be selected as a target of application failover, and the primary replica maintained therein may be used to establish application state. If no primary nodes are found, the recovery manager may be configured to use the commit record and the secondary replication completion record to identify an appropriate secondary group node (e.g., the node with the latest set of committed updates) as a failover target.

In some embodiments, the replication manager may be configured to automatically identify the specific blocks of the source memory region that are to be replicated—e.g., if the replication request does not explicitly identify the blocks. The replication manager may use a record of updates made to the source memory region to identify the blocks that have been updated since a previous replication request or transaction, and may copy only the updated blocks in response to the replication request in such embodiments. In one specific embodiment, the initiator may be configured to identify one or more nodes to be included within the secondary group—e.g., the selection of nodes for a secondary group may be performed independently or autonomously of the selection of nodes for the primary group. Multiple stages of secondary replication may be implemented in some embodiments, and the different stages may have different consistency semantics with respect to each other.

BRIEF DESCRIPTION OF THE DRAWINGS

FIG. 10 is a block diagram illustrating a computer readable medium according to one embodiment.

Figure 1:
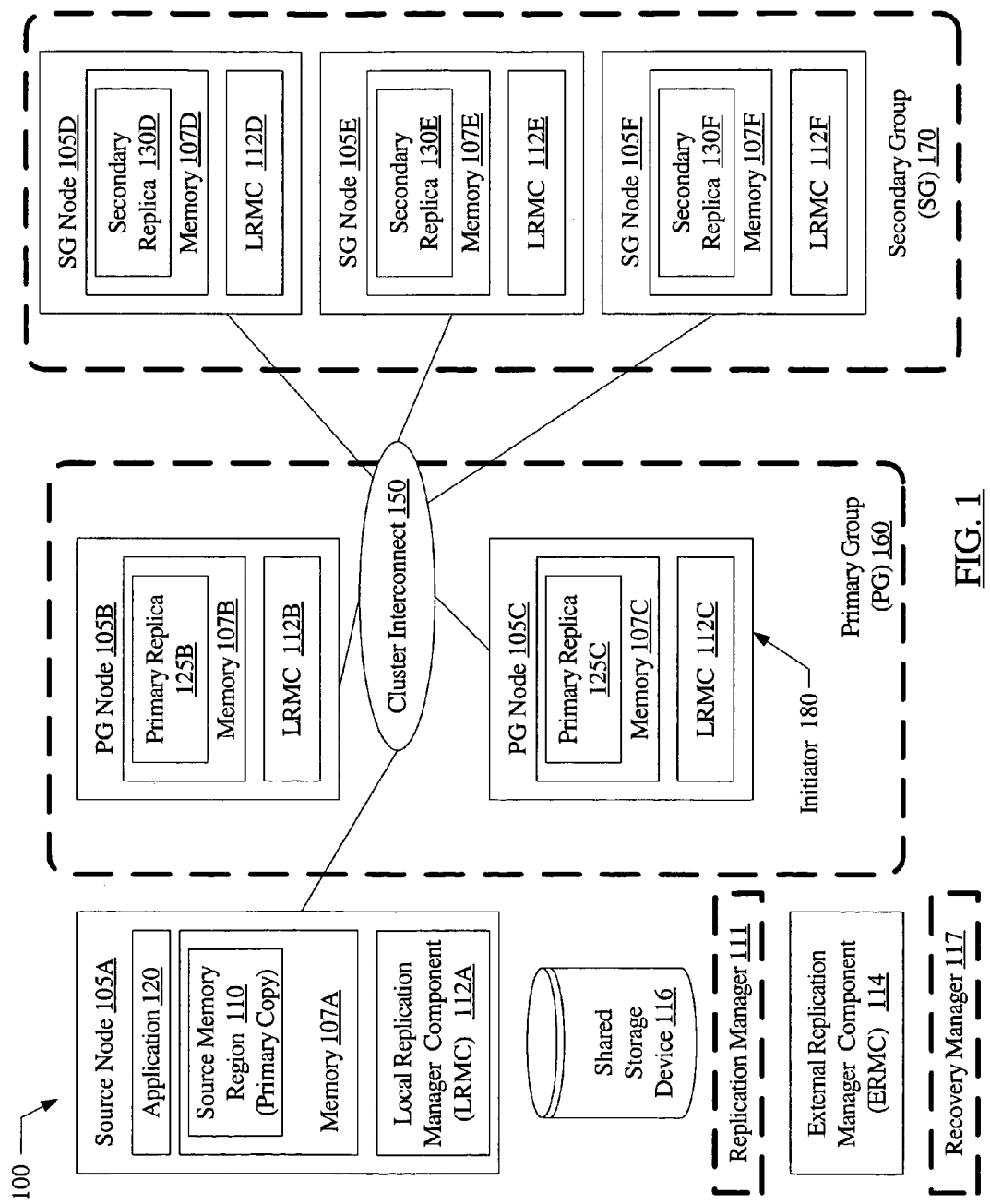
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a cluster comprising a plurality of nodes 105 (e.g., node 105A-105F), and a replication manager 111 which may in turn include a plurality of local replication manager components (LRMC) 112 (e.g., LRMC 112A on node 105A, LRMC 112B on node 105B, etc.). In some embodiments, replication manager 111 may also include an external replication manager component (ERMC 114) (such as a replication configuration manager and/or administrative interface), which may be incorporated at a server or host external to the cluster. It is noted that in the following description, the term "replication manager" may be used to refer generically to any of the components of replication manager 111, including local replication manager components 112 and external replication manager component 114, or to any combination of the local and external components. Replication manager 111 may be configured to support replication of an application's state information, such as the state information for application 120. As shown, the primary copy of application 120's state information may be maintained within a source memory region 110 of memory 107A at node 105A, which may also be termed a "source node" herein. Replicas of the primary copy, such as primary replicas 125B and 125C and secondary replicas 130D-130F may be maintained at other nodes 105 by replication manager 111. One of the replicas may be used by a recovery manager 117 to support failover of application 120 to the corresponding node in some embodiments, e.g., in the event of a failure at source node 105A or application 120. Further details regarding the operation of recovery manager 117 are provided below in conjunction with the description of FIG. 6.

Nodes 105 may be linked to each other via cluster interconnect 150, and may also have access to shared storage device 116. Any of a variety of types of standards-based or proprietary physical links and/or protocols may be used to implement interconnect 150. In some embodiments, cluster interconnect 150 may be distributed across multiple physical locations and/or may comprise a combination of multiple types of links, some with different performance characteristics than others—for example, a first group of nodes may be connected to each other by a first set of high-speed links, a second group of nodes (e.g., at a remote physical location) may be connected to each other by a second set of high-speed links, while the first and second group of nodes may be connected to each other via a relatively low-speed link such as a wide area network (WAN) link. Any desired type of storage device may be used as shared storage device 116, such as one or more disk arrays, storage appliances, and the like.

In one embodiment, a configurable replication policy may be employed to set up and manage a multi-stage replication of application 120's state information. In accordance with the configurable replication policy, the replication manager may be configured to identify a primary group (PG) 160 of one or more nodes of the cluster to store one or more primary replicas of the source memory region 110, and to identify a node of the primary group as an initiator 180 of replication to a secondary group (SG) 170 of one or more cluster nodes. Multiple initiators of replication to the secondary group may be identified in some embodiments. As described below in further detail, the configurable replication policy may include specifications of a number of different criteria that may be used to select nodes for replication, such as acceptable levels of performance, compatibility constraints on the set of nodes where an application 120's state may be replicated, etc. In one embodiment, the external replication manager component 114 may comprise a replication configuration manager that provides an administrative interface through which a user may specify details of the replication policy to be used for a particular application 120 and/or a configuration database where membership information for the primary and secondary groups may be maintained. The source memory region 110 may be replicated to each of the nodes of the primary group 160 in a first stage of replication, and then to each node of the secondary group 170 in a second stage of replication, which may be asynchronous with respect to the first stage of replication in some embodiments. Multiple stages of secondary replication (which may also be termed non-primary stages) may be supported in some embodiments, as described below in conjunction with the descriptions of FIG. 8 and FIG. 9. The nodes where replicas of source memory region 110 are maintained may be termed "replicating nodes" for application 120 herein—e.g., in the example configuration shown in FIG. 1, nodes 105B-105F may be termed replicating nodes. It is noted that not all the nodes of the cluster may be configured to participate in multi-stage replication; e.g., at a given point in time, a node may be configured neither as a source node nor a replicating node.

In response to a replication request (which may also be called a "commit request" herein), e.g., from application 120, replication manager 111 may be configured to copy contents of one or more blocks of the source memory region 110 to a respective primary replica at each of the nodes of the primary group 160 within a single atomic transaction in one embodiment. In addition, replication manager 111 may be configured to initiate an operation to copy the one or more blocks from an initiator 180 to one or more additional replicas in the secondary group 170. Replication manager 111 may be configured to use any desired reliable point-to-point communication protocol (e.g., a protocol based on IP (Internet Protocol) such as TCP (Transmission Control Protocol) or a reliable protocol customized for cluster interconnect 150) to transmit the blocks to be replicated from one node 105 to another. Replication to the primary group 160 may be termed a "primary replication stage" herein, and replication to the secondary group may be termed a "secondary replication stage". As described in further detail below, the consistency semantics for the primary and secondary replication stages may differ in some embodiments.

The data that is copied to the primary replicas and secondary replicas (e.g., the one or more blocks of source memory region 110) may be termed the "replication payload" herein. At the end of the primary replication stage, in one embodiment a transaction completion acknowledgment may be returned to the application 120 in response to the replication request, indicating that each node of the primary group 160 has a complete and consistent copy of the replication payload. In contrast, if the replication request fails (e.g., if a message containing the data blocks fails to reach a primary group node 105, or if a primary group node 105 fails), a transaction failure indication may be returned to the application 120 in some embodiments, indicating that none of the nodes of the primary group 160 have any of the contents of the replication payload. Thus, the atomicity semantics of the replication to primary group nodes may apply at two different levels in some embodiments: a successful transaction may imply that (a) all primary group nodes 105 have received the replication payload and (b) each primary group node 105 has received the entire replication payload. The atomicity semantics may further require that, after a transaction ends (either successfully or unsuccessfully), a node 105 in the primary group may not retain a partial copy of the replication payload. The primary replicas at each node 105 within the primary group 160 may be consistent with each other at the end of the primary replication stage.

The consistency semantics or requirements for the secondary replication stage may be more relaxed than those for the primary replication stage. Unlike the primary replication stage, for example, replication to a particular node 105 (e.g., 105D, 105E or 105F) of secondary group 170 may be performed independently of, and/or asynchronously with respect to, replication to another node of secondary group 170 in some embodiments. In addition, replication to any one of the nodes 105 of the secondary group 170 may be asynchronous with respect to the atomic transaction of the primary stage of replication. In some implementations, for example, the copying of the actual data blocks being updated from the initiator to one or more secondary group nodes may not begin until an acknowledgment of transaction completion has been returned to the application 120 that requested the replication. As a result of the more relaxed consistency requirements, secondary replicas 130 may not be completely consistent with one another (or with primary replicas 125) at a given point in time in some embodiments. When a particular secondary replica 130 has been updated with the replication payload, replication manager 111 (e.g., the local replication manager component 112 at the node corresponding to the particular secondary replica) may be configured to update a secondary replication completion record in one embodiment, as described below in further detail. An update of the secondary replication completion record from a node may indicate that the entire replication payload has been received and stored at that node.

The relaxed consistency semantics of secondary replication in the two-stage replication process described above may result in improved overall performance for application 120, for example compared to a traditional replication solution that may require replication to all the replicating nodes to be completed within a single synchronous and/or atomic transaction. It is noted that in general, a synchronous transaction may not necessarily be atomic, and also that an atomic transaction may not necessarily be synchronous. For example, a protocol such as a two-phase commit protocol may be used to ensure atomicity in the sense that either all nodes participating in a transaction have the complete set of changes associated with the transaction, or none of the nodes have any of the changes. However, in general it may be possible to perform the transaction including the two phase commit either synchronously or asynchronously with respect to the replication request that initiates the transaction. As the number of nodes at which replicas are to be maintained increases, the inclusion of all the replication operations within the single transaction may require substantial messaging traffic to be exchanged between the participating nodes before the transaction can be completed, thereby resulting in an increase in the average time taken for transaction completion. As the application 120 may have to wait for the transaction to complete before resuming its other functionality (i.e., functionality unrelated to replication), the efficiency with which the application may perform its normal operations may be reduced in such traditional replication solutions. Furthermore, the likelihood that a failure may occur somewhere within the set of nodes configured for the traditional replication also typically increases with the number of nodes involved, thus increasing the probability that the transaction may fail and may have to be retried in its entirety. In contrast, by restricting the primary group 160 to a relatively small number of nodes in two-stage replication as described above, the overhead of transactionally updating all the nodes of the primary group may be reduced, and the probability of successfully completing the transaction may also be increased. At the same time, the availability advantages of replicating to multiple nodes may be largely maintained, since the total number of replicas eventually created in two-stage replication is a function of the combined size of the secondary group 170 and the primary group 160, and not just a function of the size of the primary group. In addition, as described below in further detail, in some embodiments more than one secondary stage of replication may be implemented, where for example the consistency requirements for a particular secondary stage may differ from those of an earlier stage, allowing for even greater flexibility in the tradeoff between the overall availability level achieved and the overhead associated with replication.

Figure 2:
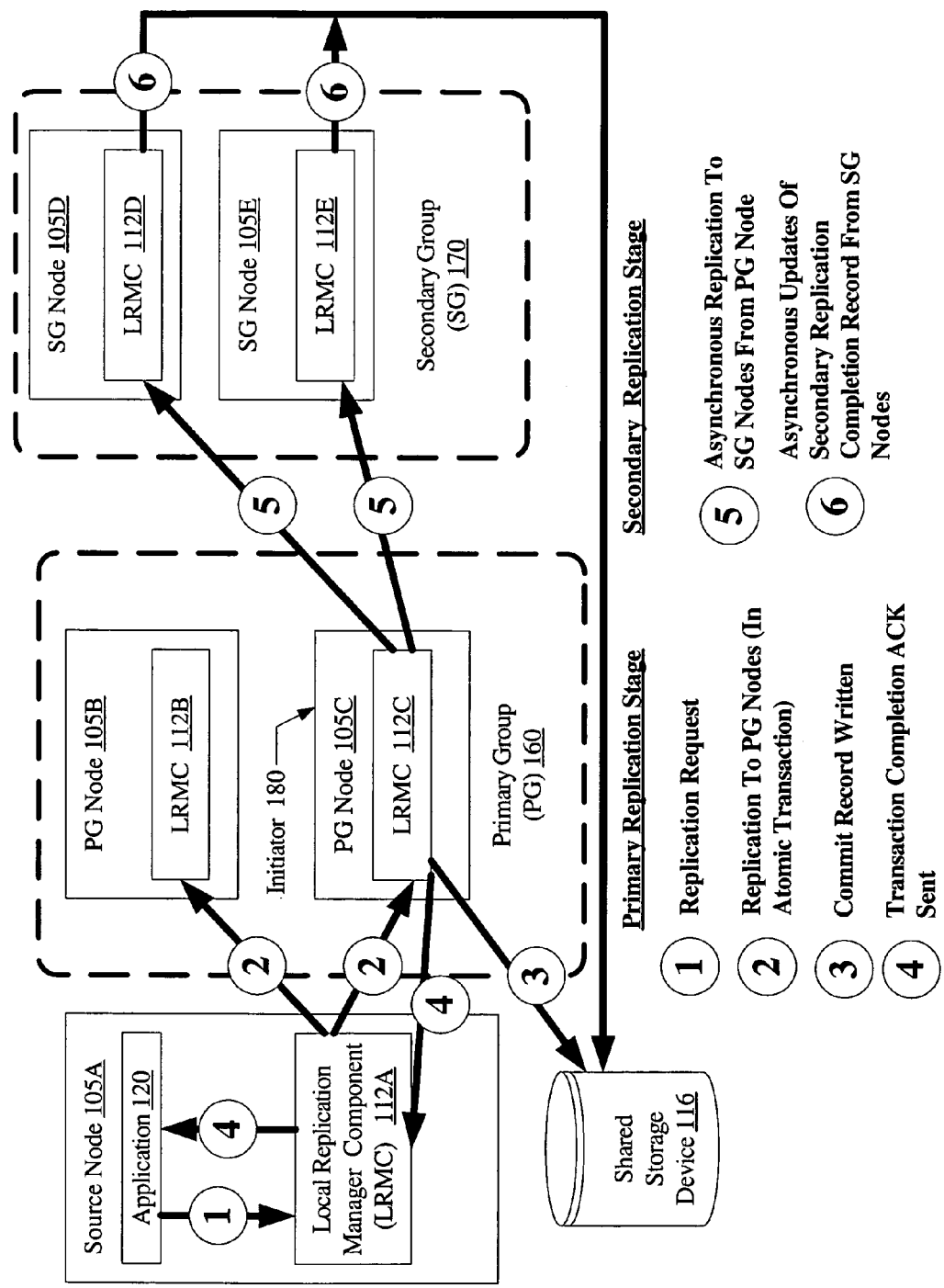
FIG. 2 is a block diagram illustrating aspects of the operation of a replication manager in response to a replication request in one exemplary cluster configuration, according to one embodiment.

FIG. 2 is a block diagram illustrating aspects of the operation of replication manager 111 (of FIG. 1) in response to a replication request in one exemplary cluster configuration, according to one embodiment. In the example cluster configuration depicted in FIG. 2, the primary group 160 includes two nodes 105B and 105C, of which node 105C has been designated as an initiator 180 of a secondary replication stage, and the secondary group 170 includes nodes 105D and 105E. Application 120 at node 105A may be configured to send a replication request to the local replication manager component 112A at node 105A, as indicated by the arrow labeled "1" in FIG. 2. The replication request may be triggered by a variety of application-specific events or causes in different embodiments. For example, in some client-server environments, application 120 may be a server application (such as a database management system or a web server) responding to client requests, and an update request from a client may trigger a corresponding replication request. In some embodiments, application 120 may be configured to detect when the fraction of the source memory region 110 that is "dirty" (i.e., contains unreplicated updates) reaches a threshold value, and such a detection may trigger the replication request. In other embodiments, application 120 may be configured to periodically (e.g., once every five seconds) request replication of any unreplicated blocks within its memory-resident application state.

In one embodiment, the replication request may not include a specific identification or list of blocks to be replicated; instead, for example, the replication request may simply identify source memory region 110 containing application 120's state information, or simply indicate that the in-memory state of the application is to be replicated. Not all of the data blocks in the source memory region 110 may have been updated since a previous replication transaction completed, so only the subset of the data blocks may have to be copied to keep the replicas up-to-date. Upon receiving such a replication request without an explicit identification of changed data blocks, in one implementation replication manager 111 may be configured to automatically identify the subset of the source memory region that has been updated since a previous replication request was generated, and copy only the blocks that belong to the subset. For example, in such an implementation, a data structure such as a bitmap may be maintained (either by the replication manager 111 or by a layer of storage management software at node 105A, such as a file system layer or a volume manager layer) as a record of updates made to the blocks of source memory region 110. Replication manager 111 may be configured to use such a record to identify the specific blocks to be copied. In other embodiments, application 120 may provide a specific list of blocks to be replicated as part of the replication request, and/or replication manager 111 may be configured to copy all the blocks of source memory region 110 during the replication.

In response to the replication request, in one embodiment replication manager 111 (e.g., the combination of local replication manager components (LRMC) 112 at the source node 105A and the nodes of the primary group 160) may be configured to implement the primary stage of replication, as indicated by the arrows labeled "2" in FIG. 2. That is, replication manager 111 may, within the scope of a single atomic transaction, copy contents of one or more data blocks of source memory region 110 to primary group nodes 105B and 105C, and generate a commit record for the transaction (which may include, for example, a unique transaction identifier and/or a data structure identifying the blocks of the replication payload). The specific techniques (such as two-phase commit) that may be used to ensure atomicity of the transaction may vary from one embodiment to another. A local component of replication manager 111, such as LRMC 112C at the initiator 180 may write the commit record to a shared storage device 116 (as indicated by the arrow labeled "3" in FIG. 2) that is accessible from at least one node of the secondary group. In some embodiments the shared storage device 116 may be accessible from all the nodes participating in the replication—i.e., from the source node 105A, the primary group nodes as well as the secondary group nodes. The commit record may be written to the shared storage device 116 in a synchronous and atomic operation. In one embodiment, a secondary replication completion record associated with the commit record may also be initialized within shared storage device 116 when the commit record is written. During the secondary stage of replication, the secondary replication completion record may be used to indicate which nodes of the secondary group have completed copying the replication payload. Updates to the secondary replication completion record may also be atomic and synchronous in some embodiments. Further details of the contents of the commit record and the secondary replication completion record are provided below, in conjunction with the description of FIG. 5.

After the commit record has been written, LRMC 112C may send an acknowledgment of transaction completion to LRMC 112A at source node 105A, and LRMC 112A may in turn forward the acknowledgment to application 120 (as indicated by the arrows labeled "4" in FIG. 2), allowing application 120 to resume functions that may not be directly related to replication. Initiator 180 (node 105C) may initiate the secondary replication stage after the commit record has been written, as indicated by the arrows labeled "5" in FIG. 2. During this stage, as described earlier, the replication payload may be copied to the nodes of the secondary group outside the scope of the atomic transaction described above. In some embodiments, for example, replication to a first secondary group node 105D may be asynchronous with respect to replication to a second secondary group node 105E, and both secondary replication operations may be asynchronous with respect to the atomic transaction of the primary group replication. Thus, from the point of view of the application 120 in such embodiments, only primary group replication may be both atomic and synchronous. When a particular secondary group node completes copying the payload, it (e.g., the LRMC 112 at that node) may update the secondary replication completion record (as indicated by the arrows labeled "6" in FIG. 2). It is noted that in some embodiments, some of the specific operations illustrated in FIG. 2 may be performed differently or eliminated—for example, in one embodiment, the initiator 180 may directly send the transaction completion acknowledgment to application 120, while in another embodiment, LRMC 112A may write the commit record to shared storage. In addition, the commit record and the secondary replication completion record may be stored in different locations in some embodiments. Any appropriate protocols may be used for the communications among the nodes 105 and between the nodes 105 and shared storage device 116—for example, a reliable point-to-point or unicast communication protocol may be used for node-to-node communication in one embodiment, and a Fiber Channel-based or SCSI-based protocol may be used for I/O to the shared storage device.

Figure 3:
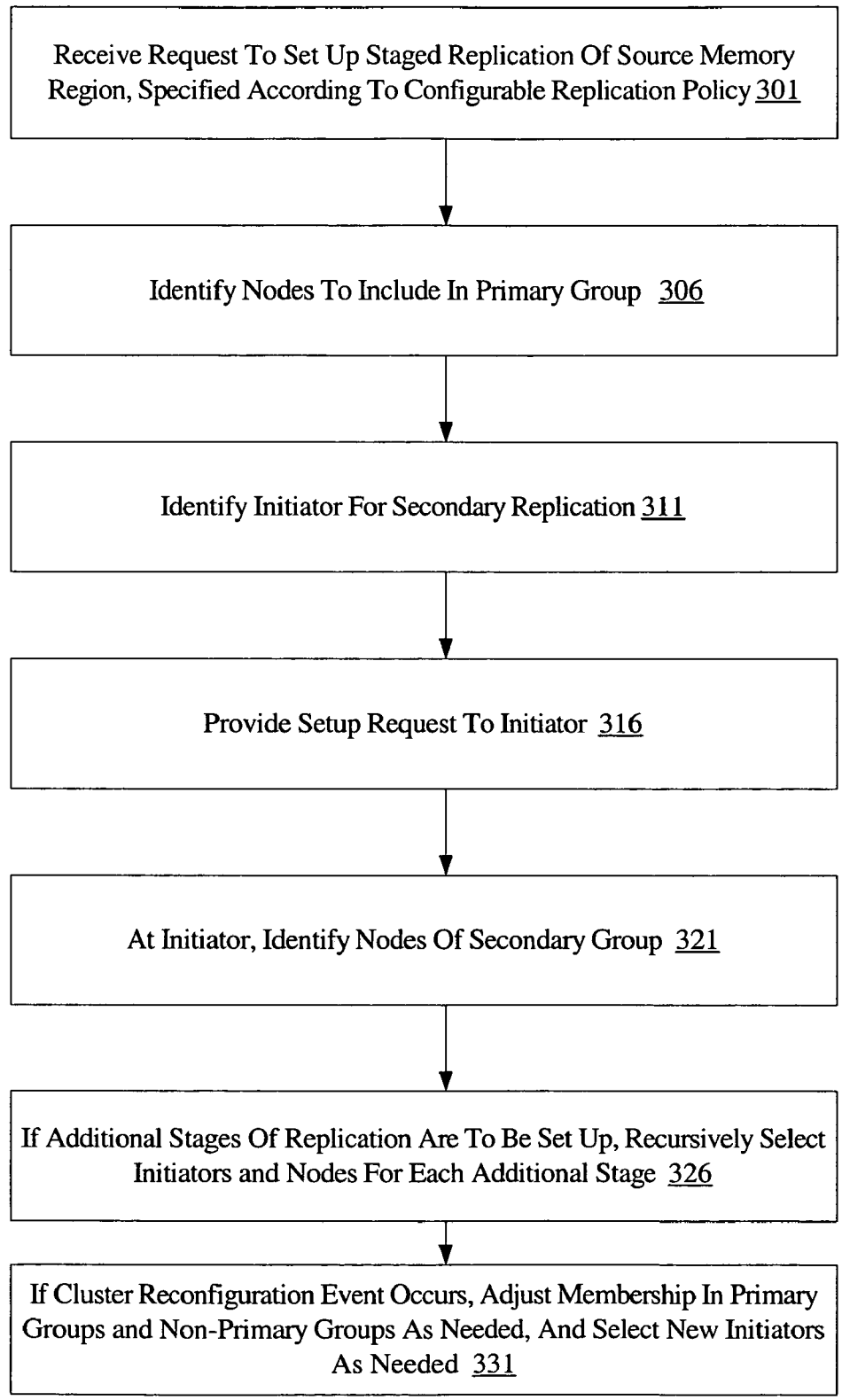
FIG. 3 is a flow diagram illustrating aspects of the operation of a replication manager in response to a request to set up a multi-stage replication environment, according to one embodiment.

As noted previously, replication manager 111 may be configured to identify the specific nodes to be included within primary group 160 and secondary group 170 according to a configurable replication policy in some embodiments. FIG. 3 is a flow diagram illustrating aspects of the operation of replication manager 111 in response to a request to set up a multi-stage replication environment, according to one embodiment. The request to set up the multi-stage replication may be termed a "setup request" herein, and a variety of specific requirements may be included in the setup request in accordance with the configurable replication policy. The setup request may be generated, for example, by an application 120 upon application startup, or in response to administrator input delivered via an interface provided by external replication manager component 114 or by a local replication manager 112. On receiving a setup request (block 301), replication manager 111 may be configured to identify the nodes to be included in the primary group (block 306), and to identify one or more initiators 180 for secondary replication (block 311) in accordance with the configurable replication policy.

The setup request may include a variety of different requirements in different embodiments. For example, in one embodiment, the configurable replication policy may allow a specification of details such as the depth, width and/or fanout of various levels of a desired multi-stage replication hierarchy where the first or parent level of the hierarchy includes the primary group 160, and the remaining child levels include one or more secondary (or non-primary) groups. Each level of the hierarchy may represent a different replication stage, which may have different consistency requirements from the consistency requirements of a previous stage. A particular setup request may specify, for example, that three stages of replication are desired for a particular application 120 at a source node 105A, with at least two nodes in a primary group 160, two nodes in a first non-primary group, and two nodes in a third non-primary group. In some implementations, e.g., where each replication stage may include multiple initiators, the desired number of initiators for each stage, and/or a desired fanout or number of target nodes to which replication from a given initiator is performed, may also be specified. The request may also include a specification of the specific consistency semantics for replication at each replication stage: for example, that replication to all nodes of the primary group 160 should be within a single atomic transaction, that replication to each node of a first secondary group 170 may be asynchronous with respect to the single atomic transaction but synchronous with respect to other nodes within the first secondary group, etc. Thus, it may be possible to specify different consistency semantics for as many of the configured replication stages as desired.

In some embodiments, the setup request may include performance criteria that may be used by replication manager 111 in selecting the specific set of nodes 105 to include within a particular primary or non-primary group. For example, in one such embodiment, replication manager 111 may be requested to select a target node for inclusion in the primary group only if the average round-trip delay for a message from the source node to that target node is within a threshold value, or only if a particular type of high-speed link connects the source and target nodes, or based on one or more other expected or measured performance metrics. In another embodiment, software compatibility criteria may be specified in the setup request. For example, in one embodiment, application 120 may depend upon a second application, and not all nodes 105 may have the second application installed or have software licenses for the second application. Since any replicating node may potentially be selected for failover of application 120 by recovery manager 117, only those nodes that meet the software compatibility criteria (e.g., those nodes with the desired second application installed and licensed) may be selected for replication. In addition, in some embodiments, node-specific licenses may be associated with application 120 itself, so only the specific set of nodes 105 that have appropriate licenses may be selected as replication targets. Other types of requirements, e.g., requirements based on measured availability metrics such as failure rates or recovery times, may be specified via the configurable replication policy in various embodiments. In addition to specifying criteria that may be used to identify membership in various primary and non-primary groups, the policy may allow similar specifications (e.g., based on performance characteristics) allowing a selection of the specific nodes to serve as initiators 180 for each stage of replication. As described below in conjunction with the description of FIG. 9, in some embodiments, multiple initiators 180 may be specified for a given stage of replication.

In one embodiment, the LRMC at an initiator 180 of a secondary replication stage may be configured to autonomously select one or more nodes to be included in the secondary group 170, i.e., the decision as to which nodes are to be included in the secondary group 160 may be made at a different node than the node where the members of the primary group are identified. For example, in one embodiment, a "stretch cluster" or "wide area cluster" may be employed, where for example a first set of nodes S1 is located at a first data center D1, and a second set of nodes S2 of the same cluster is located at a second data center D2, and the nodes of S1 are linked to the nodes of S2 by a wide area network or WAN. In such a configuration, an LRMC 112 at an initiator 180 of secondary replication (which may belong to either S1 or S2) may have more detailed information available about nodes in D2 (e.g., more detailed information about the local performance metrics and/or availability metrics in data center D2) than other nodes in S1, so the LRMC 112 at that initiator may be in a better position to identify the specific nodes that should participate in secondary stage replication than any other LRMC in S1. In such an embodiment, the setup request (or a subset of its contents) may be provided to the initiator 180 (block 316) and the LRMC at the initiator 180 may be configured to autonomously identify nodes to be included in the secondary group (block 321). If additional stages of replication are to be set up, initiators and nodes participating in the additional stages may be selected recursively in some embodiments (block 326), e.g., the operations corresponding to blocks 311, 316 and 321 of FIG. 3 may be repeated for each successive stage. If a cluster reconfiguration event occurs (e.g., if a node leaves or joins the cluster), replication manager 111 may be configured to adjust the membership in the primary and secondary groups and/or select new initiators 180 for various stages of replication as needed (block 331). It is noted that several of the operations illustrated in FIG. 3 may be omitted (or performed in a different order than shown in FIG. 3) in some embodiments—for example, in embodiments where decisions about primary and secondary group membership are made at the same node, operations corresponding to blocks 316 and 321 may be omitted.

Results of the multi-stage replication setup (e.g., an identification of the specific nodes that form part of the primary and secondary groups 160 and 170 for a given application 120, and/or an identification of the initiators) may be stored in a configuration database in some embodiments. The configuration database may be centrally managed (e.g., by ERMC 114) in some embodiments, while in other embodiments, the configuration information may instead, or in addition, be distributed to some or all of the replicating nodes in the primary and secondary group or groups.

Figure 4:
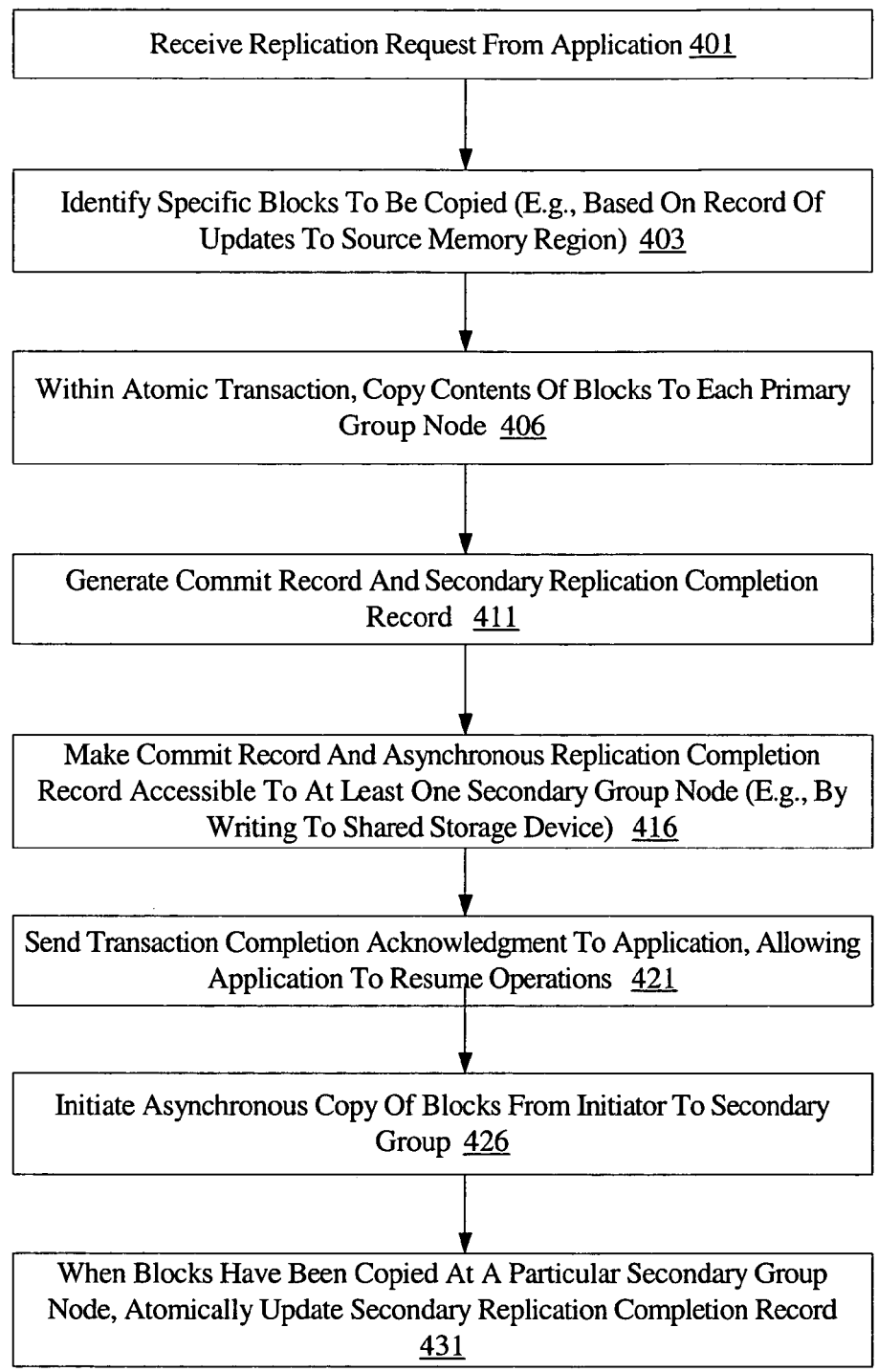
FIG. 4 is a flow diagram illustrating aspects of the operation of a replication manager in response to a replication request from an application, according to one embodiment.

After the multi-stage replication environment has been set up for an application 120, the application may begin or resume its normal functions, which may result in changes to application state information stored in source memory region 110. As noted above, the application 120 may request that its state information (or changes to its state information since a previous replication request) be replicated based on various triggering conditions in different embodiments, such as a completion of processing for a client request, a detection of a threshold "dirty" fraction of source memory region 110, etc. FIG. 4 is a flow diagram illustrating aspects of the operation of replication manager 111 in response to a replication request from application 120, according to one embodiment. The state information may be maintained by application 120 within any desired in-memory storage object, such as a memory-mapped region of a file in one implementation. In the embodiment depicted in FIG. 4, upon receiving the replication request (block 401), replication manager 111 may be configured to identify the specific set of data blocks to be copied (i.e., the replication payload), e.g., based on a record of updates made to the source memory region 110 (block 403). As noted previously, in some embodiments the replication request may explicitly identify the set of blocks to be copied, in which case the replication manager may obtain the information provided in the replication request to determine which blocks are to be copied. In other embodiments, all the blocks of the source memory region 110 may be copied in response to each replication request.

Having identified the set of blocks of source memory region 110 to be replicated, replication manager 111 may, within a single atomic transaction, replicate the payload at each of the nodes of the primary group 160 (block 406). In some embodiments, for example, replication manager 111 may use a reliable messaging protocol to send a message containing the replication payload to each node of the primary group. Upon receiving such a message, the LRMC 112 at a receiving node may be configured to atomically copy (e.g., in the context of an interrupt indicating that the message has been received) the contents of the payload to a region of memory containing a primary replica 125. If the primary group 160 includes more than one node 105, the LRMCs 112 at each of the nodes in the primary group may communicate with each other and/or with the source node (e.g., using a two-phase commit protocol) to ensure that the replication payload has been fully replicated at each primary group node. After the payload has been replicated at each primary group node, a commit record and a secondary replication record may be generated by a replication manager component (block 411), such as the LRMC 112 at the initiator 180.

Figure 5:
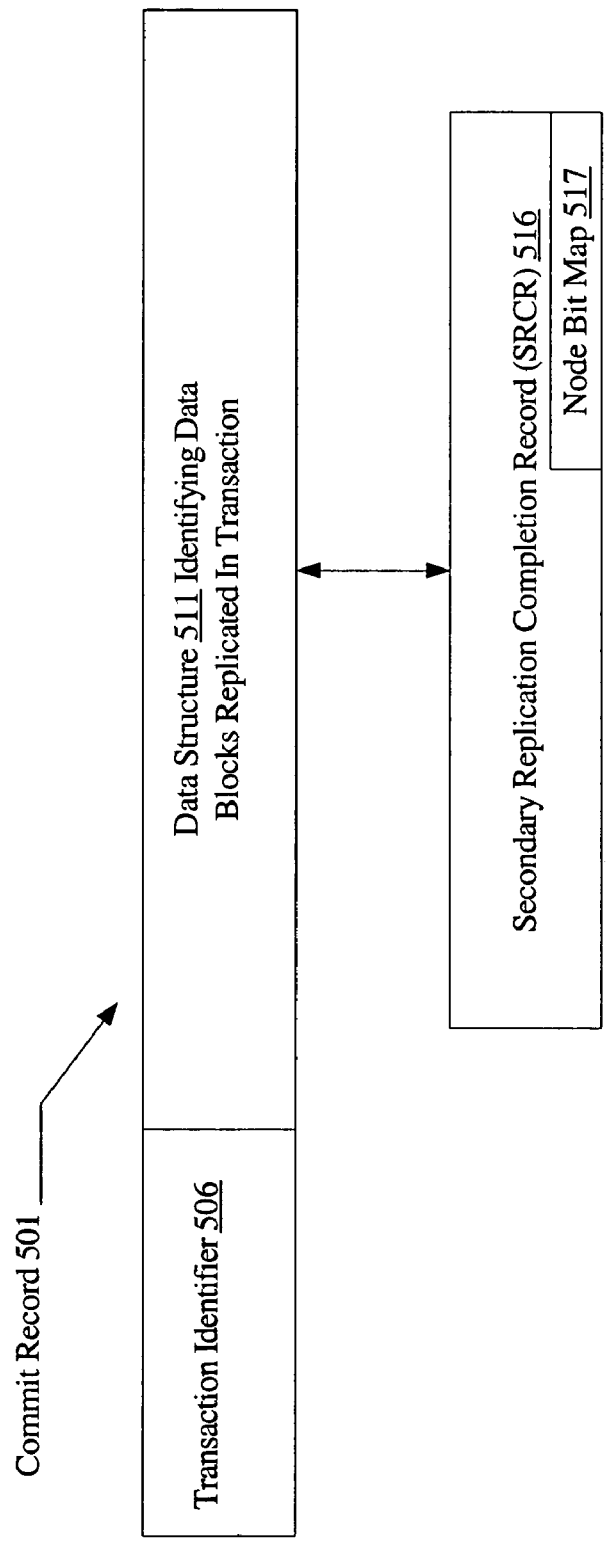
FIG. 5 is a block diagram illustrating components of a commit record and a secondary replication completion record, according to one embodiment.

FIG. 5 is a block diagram illustrating components of a commit record 501 and a secondary replication completion record (SRCR) 516, according to one embodiment. As shown, commit record 501 may include a transaction identifier 506 and a data structure 511 identifying the specific data blocks being replicated in the transaction. The transaction identifier 506 may be a unique identifier (e.g., unique with respect to other transactions initiated from a particular source node 105A on behalf of a particular application 120), which may be generated at the source node 105A and/or included in the replication request in some embodiments. Any suitable data structure 511 may be used to identify the specific blocks of source memory region 110 that are being replicated, such as a bit map, a list, an array, etc. For example, in embodiments where source memory region 110 and primary and secondary replicas 125 and 130 are each implemented as a contiguous array of fixed-size memory blocks, data structure 511 may be implemented as a bit map identifying the specific offsets within the array at which updates were made during the current transaction. In some embodiments, other information may also be included within the commit record 501, such as one or more timestamps (e.g., a transaction start timestamp and a transaction end timestamp), statistics, a pointer to an SRCR 516 if the SRCR is not included in the commit record, etc.

SRCR 516 may be included within commit record 501 in some embodiments, and may be maintained separately in other embodiments. SRCR 516 may include a data structure, such as a node bit map 517, indicating which secondary nodes have completed replicating the payload identified by data structure 511. For example, in an embodiment where the maximum number of secondary group nodes expected to participate in replication is 32, a 32-bit map may be used to record secondary replication completions. All 32 bits may initially be cleared (e.g., at the time the SRCR is generated). As described below, when a particular secondary group node 105 completes replicating the payload identified in a given commit record 501 during a secondary replication stage, it may update a respective bit within node bit map 517. In some embodiments, e.g., where SRCR 516 is stored separately from commit record 501, SRCS 516 may include a pointer to the commit record, or the transaction identifier 506 of the corresponding commit record.

After the commit record 501 and SRCR 516 have been generated, replication manager 111 makes the commit record and SRCR accessible to at least one node in the secondary group (block 416 of FIG. 4), e.g., by writing the commit record and the secondary replication record to a shared storage device 116 accessible from the secondary group node or nodes. The specific set of secondary group nodes which are provided with access to the commit record may be chosen based on, for example, connectivity constraints or performance constraints: not all nodes of the secondary group may have direct connectivity to the shared storage device 116 in one embodiment, and some secondary group nodes may have more efficient connections to shared storage device 116 than others. In some embodiments, the commit record 501 and SRCR 516 may be made accessible to each node participating in the multi-stage replication (e.g., source node 105A, nodes in primary group 160 as well as nodes in all non-primary groups). In one specific embodiment, in addition to or instead of writing the commit record 501 and SRCR 516 to shared storage, an LRMC 112 at the initiator 180 may also send commit record 501 and/or SRCR 516 to LRMCs at one or more nodes within a secondary group 170, e.g., using a two-phase commit protocol that includes exchanging messages via a reliable point-to-point communication protocol. Such a technique may be used, for example, in some implementations where a shared storage device 116 accessible from one or more of the secondary group nodes may not be available. The contents of commit record 501 and/or SRCR 516 may be made accessible to the secondary group nodes using any desired single technique (such as those described above, e.g., writing to a shared storage device, or using a two-phase commit protocol over a network) or combination of techniques in various embodiments. The distribution of commit record and/or SRCR contents to the secondary group nodes may be made atomic (e.g., implementing a version of a two-phase commit protocol) in some embodiments, e.g., LRMC 112 at initiator 180 may be configured to ensure that either all the participating secondary group nodes have the entire contents, or none of the nodes have any of the contents. Partial or incomplete commit records 501 and/or SRCRs 516 may not be maintained or stored persistently at any of the nodes in such embodiments. In addition, in some embodiments the distribution of the commit record contents and/or SRCR contents may also be synchronous with respect to the transaction initiated by the replication request.

After the commit record 501 and SRCR 516 have been made accessible to the node or nodes in the secondary group 170, a replication manager component, such as LRMC 112 at the initiator 180, may be configured to send a transaction completion acknowledgement message to application 120, either directly or through the LRMC at the source node (block 421), thus allowing the application to proceed (and potentially to overwrite one of the blocks of the source memory region 110 that formed part of the payload of the transaction that was just completed). In the embodiment depicted in FIG. 4, the LRMC at the initiator 180 may then begin asynchronous copying of the payload blocks to one or more secondary group nodes (block 426). In other embodiments, the copying of the blocks to the secondary nodes may also be synchronous, but may still be decoupled from the replication to the primary group nodes—i.e., while secondary phase replication may also be performed in one or more synchronous operations, the secondary phase synchronous operations may be performed independently with respect to the primary phase replication transaction. When the replication payload blocks have been copied at a particular secondary group node, the LRMC 112 at that node may be configured to atomically and/or synchronously update the SRCR 516 associated with the corresponding transaction's commit record 501 (block 431).

Figure 6:
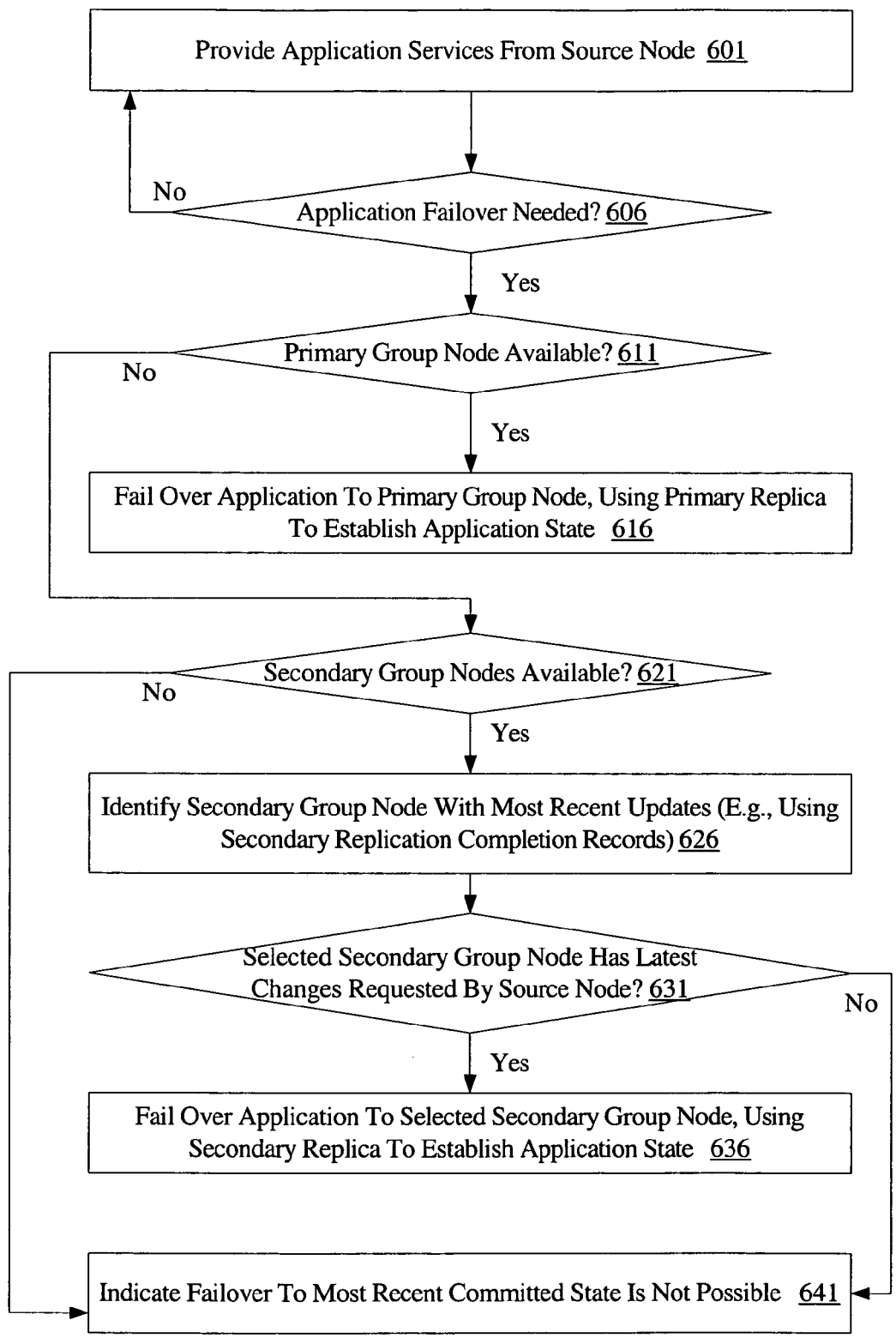
FIG. 6 is a flow diagram illustrating aspects of the operation of a recovery manager according to one embodiment.

If application 120 fails, or source node 105A fails, application 120 may be failed over to a selected node from among the set of nodes where its state information is replicated. Application failover may be managed by recovery manager 117 (shown in FIG. 1) in some embodiments, which may, for example, be included in a component of cluster management software employed in system 100, or may be implemented as a distributed component of application 120 itself. In some implementations, the recovery manager 117 may be a standalone software product, or may be included in replication manager 111. Like replication manager 111, recovery manager 117 may also include local components at nodes 105 as well as one or more external components in some embodiments. FIG. 6 is a flow diagram illustrating aspects of the operation of recovery manager 117 according to one embodiment. During normal operation, the functionality or services of application 120 may be provided from source node 105A (block 601 of FIG. 6). If it is determined that a failover of application 120 is needed (block 606), recovery manager 117 may be configured to identify a target node to which application 120 may be failed over. The determination that a failover is needed may be made using any conventional techniques, such as by recovery manager 117 using heartbeat messages to monitor the application 120. Recovery manager 117 may first attempt to find a primary group node, where the latest replicated application state for application 120 may be found (block 611). If one or more nodes of primary group 160 are found to be operational and available, a particular node from primary group 160 may be selected as the failover target. In different embodiments, if multiple nodes of primary group 160 are available, any of a variety of techniques may be used to select the particular primary group node to be used for failover—e.g., the node may be selected at random, or based on current load measurements (e.g., the least loaded primary group node may be selected), etc. The application 120 may then be failed over to the selected primary group node, using the primary replica 125 at the selected node to establish application state (block 616).

If none of the primary group nodes are available (e.g., in some rare circumstances when source node 105A and all the nodes of primary group 160 fail at the same time), recovery manager 117 may be configured to determine whether one or more secondary group nodes are available (block 621 of FIG. 6). If some secondary group nodes are available, recovery manager 117 may be configured to identify the particular secondary group node or nodes that have the most recent updates (block 626 of FIG. 6) among the set of available secondary group nodes. In embodiments where SRCRs 516 are implemented, the contents of the SRCRs 516 for the most recent commit record or records 501 may be used to identify the most up-to-date secondary group node or nodes. For example, if a node bit map 517 for the latest commit record 501 identifies nodes 105C and 105B as having replicated the payload of the latest commit record 501, one of nodes 105B and 105C may be selected as the failover target. In other embodiments, replication manager 111 may be configured to communicate with one or more nodes of the secondary group to identify the node or nodes with the latest updates. As in the case of selecting a particular primary group node as a failover target from among a set of available primary group nodes, any of a variety of techniques such as random selection may be used to select a particular secondary group node as the failover target. If the most up-to-date secondary group node does not have the latest updates requested for replication by source node 105A (as detected in block 631), or if no secondary group nodes are available, in some embodiments recovery manager 117 may be configured to indicate that failover to the most recent committed state of application 120 (i.e., the application state corresponding to the latest successful replication request from source node 105A for application 120) may not be possible (block 641). In some embodiments, instead of indicating that failover is not possible in such scenarios, recovery manager 117 may be configured to instead notify an administrator, and/or select a specific node identified by the administrator (e.g., a node identified by the administrator as having the most recent changes among the available nodes) as the failover target. Otherwise, the application 120 may be failed over to the selected secondary group node (block 636) and the secondary replica 130 at that node to establish application state. Note that the probability of not finding a primary node or a secondary node with the latest changes to source memory region 110 is generally expected to be very low, as such a state would be reached only in the event of multiple simultaneous failures at primary and secondary groups.

Figure 7:
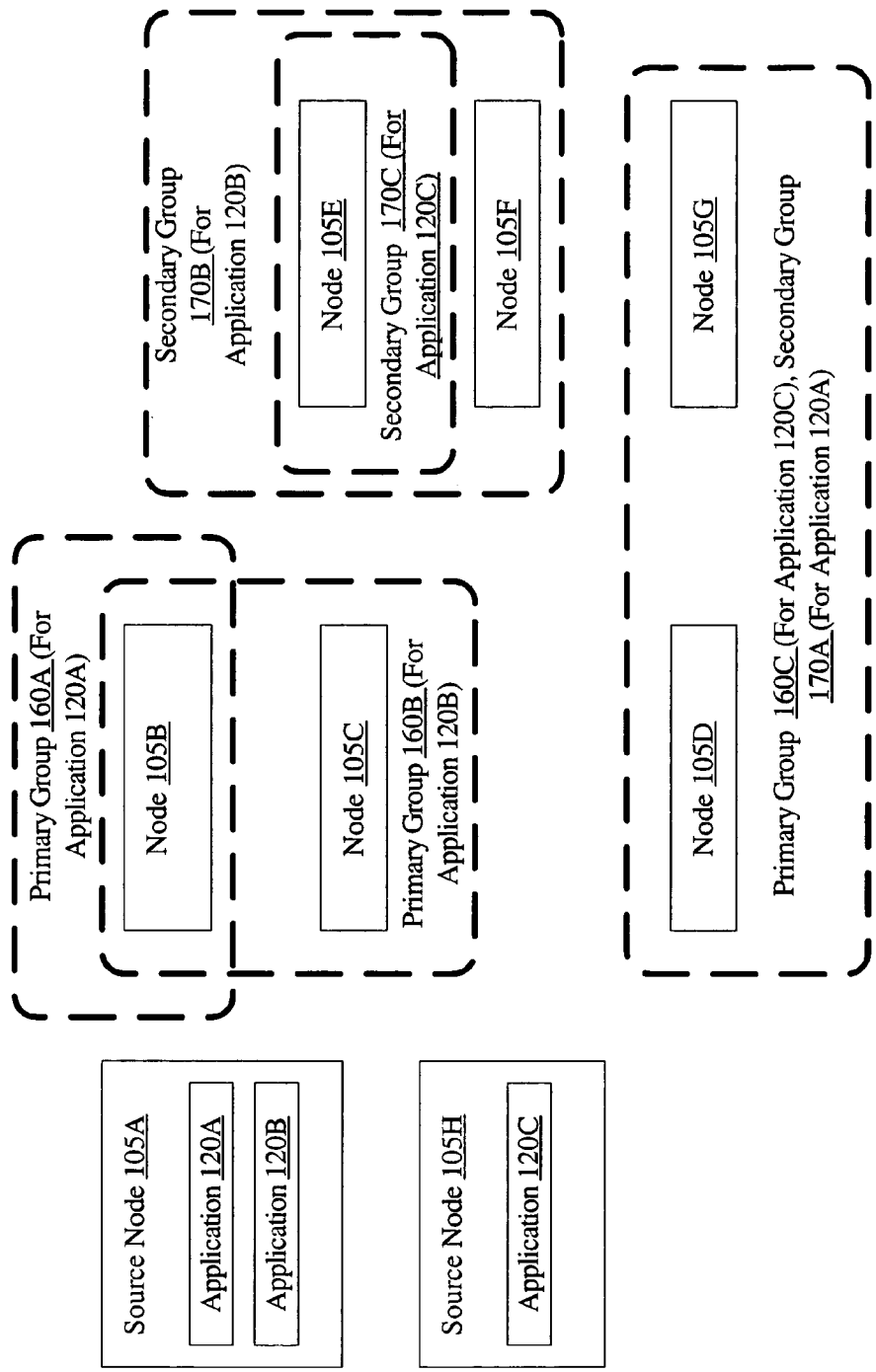
FIG. 7 is a block diagram illustrating an embodiment, where an exemplary cluster includes eight nodes and supports multi-stage replication for three applications.

The techniques of setting up and performing multi-stage replication described above may be employed for multiple applications 120 in some embodiments, where a single node 105 may simultaneously serve as a primary group member for one application while serving as a secondary group member for another application. FIG. 7 is a block diagram illustrating such an embodiment, where an exemplary cluster includes eight nodes 105A-105H and supports multi-stage replication for three applications 120A-120C. As shown, applications 120A and 120B run at node 105A, while application 120C runs at node 105H. Using a configurable replication policy as described above, each application 120 has an associated primary group 160 and an associated secondary group group 170A includes nodes 105D and 105G. For application 120B, primary group 160B includes nodes 105B and 105C, while secondary group 170B includes nodes 105E and 105F. Finally, application 120C has an associated primary group 160C including nodes 105D and 105G, and an associated secondary group 170C comprising node 105E. As shown, various nodes of the cluster may be configured as desired to serve as primary group members and/or as secondary group members for different applications, as desired. In some embodiments, for example to reduce potential contention for storage resources, the commit records 501 and/or SRCRs 516 for different applications 120 may be stored in different shared storage devices 116 rather than in a single shared storage device 116.

Figure 8:
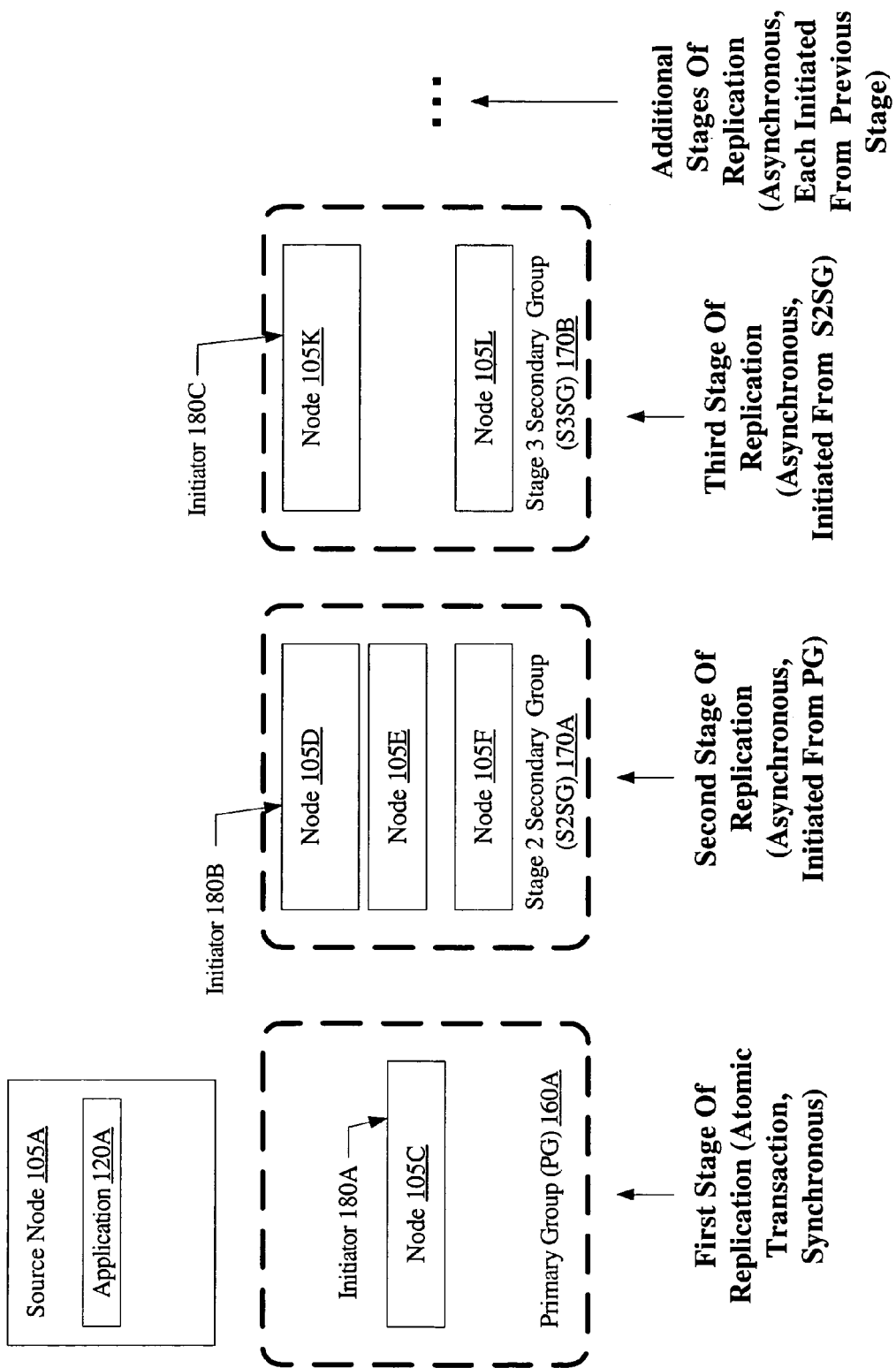
FIG. 8 is a block diagram an embodiment where multiple stages of replication are supported.

As noted earlier, in some embodiments, replication manager 111 may support multiple stages of replication. FIG. 8 is a block diagram illustrating such an embodiment. As shown, in a first stage of replication, a replication payload may be copied from a source node 105A to the node or nodes of a primary group as part of a single synchronous transaction. A LRMC 112 at initiator 180A in the primary group may initiate a second stage of replication, e.g., to nodes 105D-105F of a Stage 2 Secondary Group (S2SG) 170A. In turn, an initiator 180B (node 105D in the illustrated example) of S2SG 170A may initiate a third stage of replication, e.g., to nodes 105K and 105L of a Stage 3 Secondary Group 170B. An additional stage of replication may be initiated from one or more initiators at each successive stage, as desired. In some embodiments, a single commit record 501 and SRCR 516 may be maintained for all the stages, while in other embodiments, separate commit records and/or SRCRs may be maintained for different stages of secondary replication. For example, in one embodiment where the nodes of a particular secondary group are located at a remote data center (e.g., a data center that is physically remote from the source node and the primary group), a local version of the SRCR 516 for the nodes of that group may be maintained at least temporarily at the remote data center, e.g., to reduce messaging over a WAN. In some such embodiments, copies of local versions of SRCRs may be periodically sent to the primary group 160 and/or to other secondary groups to bring all participating nodes up-to-date with respect to secondary replication completion progress.

Figure 9:
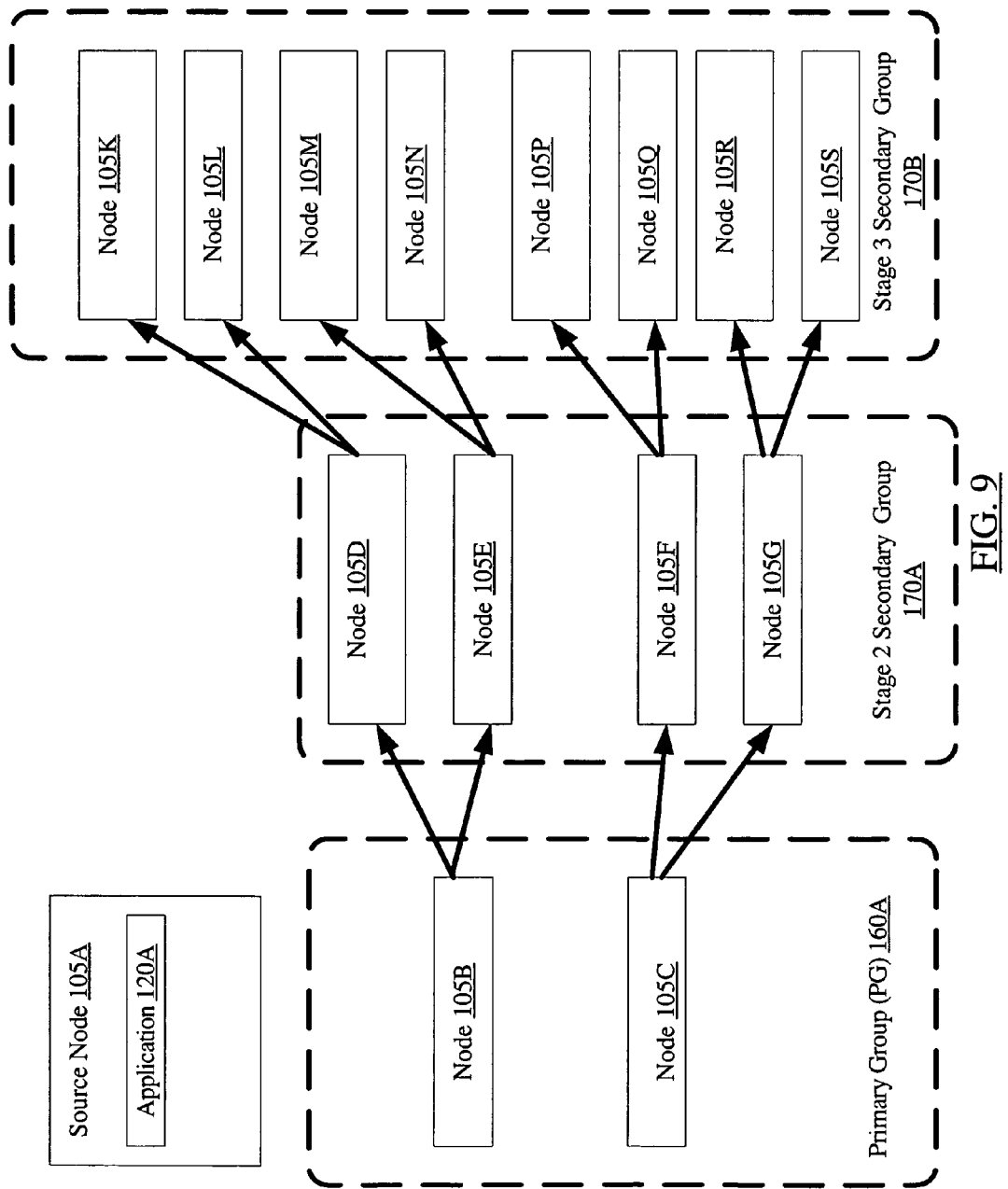
FIG. 9 is a block diagram illustrating an embodiment where a local replication manager component at each node of a primary group and a secondary group is configured to initiate replication to a respective pair of other nodes.

In some embodiments, more than one initiator 180 may be configured to initiate replication for a given replication stage. FIG. 9 is a block diagram illustrating such an embodiment, where the LRMC (not shown in FIG. 9) at each node of a primary group and a secondary group is configured to initiate replication to a respective pair of other nodes. In the illustrated embodiment, primary group 160A for application 120A comprises nodes 105B and 105C. During a primary phase of replication, the payload of a replication request from source node 105A is replicated at nodes 105B and 105C in a single atomic transaction as described earlier. In a first phase of secondary replication, the payload is copied from node 105B to nodes 105D and 105E, and from node 105C to nodes 105F and 105G. Thus, both nodes 105B and 105C act as initiators for the first stage of secondary replication. In turn, in the next stage of replication, each node 105D-105G acts as an initiator of replication to two additional nodes (e.g., the payload is copied from node 105D to nodes 105K and 105L, from node 105E to nodes 105M and 105N, and so on). In some embodiments employing multiple initiators during each replication phase, a single commit record 501 and a single SRCR 516 may be employed for all the replication phases, while in other embodiments, each initiator may be responsible for maintaining its own copy of, or a respective portion of, a commit record 501 and/or SRCR 516. It is noted that while each initiator node illustrated in FIG. 9 is shown as initiating replication to an equal number of nodes (i.e., two nodes), in other embodiments the number of nodes to which replication is performed from a given initiator may vary as desired; e.g., some initiators may be responsible for replication to a single node, while others may be responsible for replication to multiple nodes.

FIG. 10 is a block diagram illustrating a computer readable medium 1000, according to one embodiment. The computer readable medium may include replication and recovery software 1010 executable to implement the functionality of replication manager 111 and recovery manager 117 as described above, including local and external components of the replication manager 111 and recovery manager. Generally speaking, a computer readable medium may include any media accessible by a computer during use to provide instructions and/or data to the computer. For example, a computer readable medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, replication and recovery software 1010 may be included within an operating system, volume manager, or another software package. In other embodiments, one or more components of replication and recovery software 1010 may be packaged as independent software modules. In some embodiments, part or all of the functionality of replication manager 111 and/or recovery manager 117 may be implemented via one or more hardware devices (e.g., via one or more Field Programmable Gate Array (FPGA) devices) or in firmware.

A variety of different types of applications 120 may be configured for multi-stage replication as described above. For example, in some embodiments, an application 120 may be a database management system, a web server, or a multi-tier application including a customer-facing front-end tier, one or more middleware tiers (such as application server tiers) and one or more back-end tiers. In some embodiments a separate multi-stage replication environment may be set up for each instance of a distributed application or for each tier of a multi-tiered application—e.g., an application 120 may represent a component or instance of a distributed application. In general, cluster nodes 105 may include any of a variety of devices capable of supporting applications 120 or application instances and/or one or more components of replication manager 111. In one embodiment, for example, each node 105 may be a separate computer server. Each computer server may comprise one or more processors coupled to one or more memories, as well as one or more I/O interfaces such as storage adapters allowing access to storage I/O channels, network interface cards, a mouse, keyboard and other peripherals. The one or more processors may be implemented using any desired architecture or chip set, such as the SPARC™ architecture from Sun Microsystems or the x86-compatible architectures from Intel Corporation, Advanced Micro Devices, etc. The one or more memories may be implemented using any appropriate medium such as any of various types of RAM (e.g., DRAM, SDRAM, RDRAM, SRAM, etc.). It is noted that source memory region 110 may form part of a volatile memory in some embodiments, and non-volatile memory (e.g., in any desired form of NV-RAM) in other embodiments. In some embodiments, the operating system in use at one node 105 may differ from the operating system in use at another node. In one embodiment, one or more intelligent storage devices, such as intelligent switches, may be used as a node 105. Shared storage devices 116 may include any of a number of different types of physical storage devices, such as individual disks, disk arrays, optical devices such as CD-ROMs, CD-RW drives, DVD-ROMs, DVD-RW drives, flash memory devices, various types of RAM and the like. In some embodiments, replication manager 111 may not include an external component such as ERMC 114, and the functions described above as being performed by ERMC 114 (e.g., configuration management and/or interfaces) may be performed by one or more LRMCs 112.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a cluster including a plurality of nodes, including a source node, a primary group of one or more nodes, and a secondary group of one or more nodes, wherein the primary group does not include the source node, and wherein the secondary group does not include the source node;
   a processor; and
   memory coupled to the processor, wherein the memory stores program instructions computer-executable by the processor to implement a replication manager;
   wherein the replication manager is configured to:
   in accordance with a configurable replication policy,
      identify the primary group of one or more nodes of the cluster to store one or more respective primary replicas of a specified source memory region of the source node; and
      identify a node of the primary group to serve as an initiator of replication to the secondary group of one or more nodes of the cluster; and
   in response to a replication request,
      within an atomic transaction, copy contents of one or more blocks of the source memory region to a respective primary replica at each node of the primary group; and
      initiate an operation to copy the contents of the one or more blocks from the initiator to an additional replica at an additional node of the secondary group.

2. The system as recited in claim 1, wherein the replication manager is further configured to:
   receive the replication request from an application at the source node;
   generate a commit record indicative of a completion of the transaction prior to sending an acknowledgement of transaction completion to the application; and
   make the commit record accessible to at least one node of the secondary group.

3. The system as recited in claim 2, wherein the replication manager is further configured to:
   write the commit record to a storage device accessible from the at least one node of the secondary group.

4. The system as recited in claim 2, wherein the replication manager is further configured to:
send a message containing contents of the commit record to at least one node of the secondary group.

5. The system as recited in claim 2, wherein the replication manager is further configured to:
maintain a secondary replication completion record associated with the commit record; and
update the secondary replication completion record to indicate a completion of the operation to copy the contents of the one or more blocks at the additional node of the secondary group.

6. The system as recited in claim 2, wherein the secondary group includes two or more nodes, further comprising a recovery manager, wherein the recovery manager is configured to:
upon a detection of a failure,
make a determination whether one or more nodes of the primary group are operational;
if a result of the determination is positive, select a particular node of the primary group as a failover target of the application; and,
if the result of the determination is negative, use the commit record and the secondary replication completion record to select a particular node of the secondary group as the failover target.

7. The system as recited in claim 1, wherein the replication manager is further configured to:
identify the one or more blocks of the source memory region to be copied within the atomic transaction.

8. The system as recited in claim 1, wherein the configurable replication policy includes a specification of a desired number of replication stages in a multi-stage replication hierarchy.

9. The system as recited in claim 1, wherein the configurable replication policy includes a specification of a performance criterion.

10. The system as recited in claim 1, wherein the configurable replication policy includes a specification of a software compatibility criterion.

11. The system as recited in claim 1, wherein the replication manager includes a local replication manager component at the initiator, wherein the local replication manager component is configured to identify one or more nodes to be included in the secondary group.

12. The system as recited in claim 1, wherein the source memory region is part of a volatile memory, and wherein the one or more primary replicas are maintained in volatile memory.

13. The system as recited in claim 1, wherein at least one node of the secondary group is linked to at least one node of the primary group via a wide area network (WAN).

14. A method, comprising:
in accordance with a configurable replication policy,
identifying a primary group of one or more nodes of a cluster to store one or more respective primary replicas of a specified source memory region of a source node of the cluster wherein the primary group does not include the source node; and
identify a node of the primary group to serve as an initiator of replication to a secondary group of one or more nodes of the cluster, wherein the secondary group does not include the source node; and
in response to a replication request,
within an atomic transaction, copying contents of one or more blocks of the source memory region to a respective primary replica at each node of the primary group; and
initiating an operation to copy the contents of the one or more blocks from the initiator to an additional replica at an additional node of the secondary group.

15. The method as recited in claim 14, further comprising:
receiving the replication request from an application at the source node;
generating a commit record indicative of a completion of the transaction prior to sending an acknowledgement of transaction completion to the application; and
making the commit record accessible to at least one node of the secondary group.

16. The method as recited in claim 15, further comprising:
writing the commit record to a storage device accessible from the at least one node of the secondary group.

17. The method as recited in claim 15, further comprising:
maintaining a secondary replication completion record associated with the commit record; and
updating the secondary replication completion record to indicate a completion of the operation to copy the contents of the one or more blocks at the additional node of the secondary group.

18. The method as recited in claim 14, wherein the configurable replication policy includes a specification of a desired number of replication stages in a multi-stage replication hierarchy.

19. A computer readable storage medium comprising program instructions, wherein the instructions are computer executable to:
in accordance with a configurable replication policy,
identify a primary group of one or more nodes of a cluster to store one or more respective primary replicas of a specified source memory region of a source node of the cluster, wherein the primary group does not include the source node; and
identify a node of the primary group to serve as an initiator of replication to a secondary group of one or more nodes of the cluster, wherein the secondary group does not include the source node; and
in response to a replication request,
within an atomic transaction, copy contents of one or more blocks of the source memory region to a respective primary replica at each node of the primary group; and
initiate an operation to copy the contents of the one or more blocks from the initiator to an additional replica at an additional node of the secondary group.

20. The computer readable storage medium as recited in claim 19, wherein the instructions are further executable to:
receive the replication request from an application at the source node;
generate a commit record indicative of a completion of the transaction prior to sending an acknowledgement of transaction completion to the application; and
make the commit record accessible to at least one node of the secondary group.

21. The computer readable storage medium as recited in claim 20, wherein the instructions are further executable to:
write the commit record to a storage device accessible from the at least one node of the secondary group.

22. The computer readable storage medium as recited in claim 20, wherein the instructions are further executable to:
maintain a secondary replication completion record associated with the commit record; and update the secondary replication completion record to indicate a completion of the operation to copy the contents of the one or more blocks at the additional node of the secondary group.

23. The computer readable storage medium as recited in claim 19, wherein the configurable replication policy includes a specification of a desired number of replication stages in a multi-stage replication hierarchy.

24. A device, comprising:
   a processor; and
   memory coupled to the processor,
wherein the memory stores program instructions computer-executable by the processor to implement a replication manager, wherein the replication manager is configured to:
   in accordance with a configurable replication policy, identify a primary group of one or more nodes of a cluster to store one or more respective primary replicas of a specified source memory region of a source node of the cluster wherein the primary group does not include the source node; and
   identify a node of the primary group to serve as an initiator of replication to a secondary group of one or more nodes of the cluster, wherein the primary group does not include the source node; and
in response to a replication request,
   within an atomic transaction, copy contents of one or more blocks of the source memory region to a respective primary replica at each node of the primary group; and
   initiate an operation to copy the contents of the one or more blocks from the initiator to an additional replica at an additional node of the secondary group.

* * * * *